US006531676B2

(12) United States Patent
Schwemmer et al.

(10) Patent No.: US 6,531,676 B2
(45) Date of Patent: Mar. 11, 2003

(54) METHOD FOR PRODUCING AN ELECTRICALLY CONDUCTIVE CONNECTION BY LASER RADIATION

(75) Inventors: Robert Schwemmer, Nuremberg; Manfred Frank, Ansbach, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/761,004

(22) Filed: Jan. 16, 2001

(65) Prior Publication Data

US 2001/0011418 A1 Aug. 9, 2001

(30) Foreign Application Priority Data

Jan. 22, 2000 (DE) ........................................ 100 02 703

(51) Int. Cl.[7] ............................ B23K 26/20; H01R 4/02
(52) U.S. Cl. .................................................. 219/121.64
(58) Field of Search ........................ 219/121.63, 121.64; 228/135, 262.44, 262.6

(56) References Cited

U.S. PATENT DOCUMENTS 3,935,417 A * 1/1976 Umino et al. .......... 219/121.64
4,472,693 A * 9/1984 Uemura et al. ............. 333/167
4,774,394 A 9/1988 Lemke
4,966,565 A 10/1990 Dohi
5,343,014 A * 8/1994 Ogino et al. ........... 219/121.64

FOREIGN PATENT DOCUMENTS

| | | | | |
|---|---|---|---|---|
| DE | 196 12 169 A1 | | 10/1997 | |
| EP | 0865863 A1 | * | 9/1998 | ............ 219/121.64 |
| JP | 358074294 A | * | 5/1983 | ............ 219/121.64 |
| JP | 361232082 A | * | 10/1986 | ............ 219/121.64 |
| JP | 11-214113 | | 6/1999 | |
| JP | 11248973 A | * | 9/1999 | ............ 219/121.64 |
| JP | 02000094140 A | * | 4/2000 | ............ 219/121.64 |

OTHER PUBLICATIONS

"Das Schwessen Von Kupfer Mit Dem Laserstrahl", In Fertigungstechnik Und Messtechnik 90, 1982, pp. 239–241.

* cited by examiner

*Primary Examiner*—Samuel M. Heinrich
(74) *Attorney, Agent, or Firm*—Michael J. Striker

(57) ABSTRACT

A method of producing an electrically conductive connection by laser radiation includes providing a connecting wire of a material with a higher melting temperature providing a connecting carrier of a material with a lower melting temperature, joining the connecting wire with the connecting carrier without an additional material, melting the connecting carrier with a lower melting temperature, and melting the connecting wire with a higher melting temperature on an outer surface.

5 Claims, 1 Drawing Sheet

METHOD FOR PRODUCING AN ELECTRICALLY CONDUCTIVE CONNECTION BY LASER RADIATION

BACKGROUND OF THE INVENTION

The present invention relates to a method for producing an electrically conductive connection by laser radiation.

The publication "Welding of Copper with Laser Beam" in Manufacturing Technology and Measuring Technique 90(1982) 5, pages 239–241 disclose welding of a wire with a copper plate or a copper carrier by means of a laser beam. It has been determined that the materials with high reflection properties and thereby poor absorption are not always weldable and not always weldable with each laser. A good result can be obtained by welding from a blank wire on a copper plate at an angle of 28° between the laser beam and a plate. Therefore, the multiple reflection is utilized and the energy of the laser beam is sufficient to release an abnormal absorption and to connect the plate with the wire. In the conducted research the joining partners of the same material, namely copper were utilized.

SUMMARY OF THE INVENTION

Accordingly, it is an object of the present invention to provide a method of producing an electrically conductive connection with laser radiation, which avoids the disadvantages of the prior art.

In keeping with these objects and with others which will become apparent hereinafter, one feature of present invention resides, briefly stated, in a method of producing an electrically conductive connection with laser radiation, in which the connecting carrier is melted with low melting temperature and the connecting wire is melted with the high melting temperature on the outer surface.

When the method is performed in accordance with the present invention, a mechanical and an electrically conductive connection of an iron wire with a connecting carrier of copper is produced without mechanical force application, or in other words contactlessly by means of a laser beam.

For a joining process no mechanical actions by tools are needed, so that the product, on which the electrically conductive connection is produced, can be designed in a place-saving manner. A joining at the locations which were before unaccessible can be also provided. Furthermore, it has been determined in a surprising manner that by the laser welding no hot cracks in the joint are produced and the fraction of a brittle phase in the joint is very low, so that the permanent strength of the electrical connection is provided.

In accordance with the present invention it is especially advantageous when the laser radiation is performed by a bifocal shot, and the laser radiation is directed to both metal tongues of copper.

In accordance with another feature of the present invention, it is advantageous when the connecting carrier is provided with a corresponding joining part geometry, and moreover the iron wire in the contact region with the connecting carrier is provided with a flattening.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
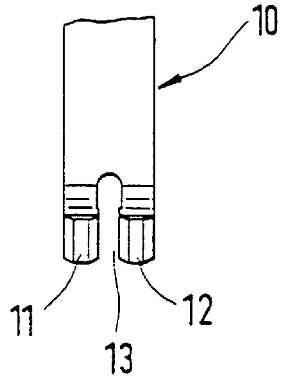
FIG. 1 is a front view of a connecting carrier which is used in a method in accordance with the present invention.
Figure 4:
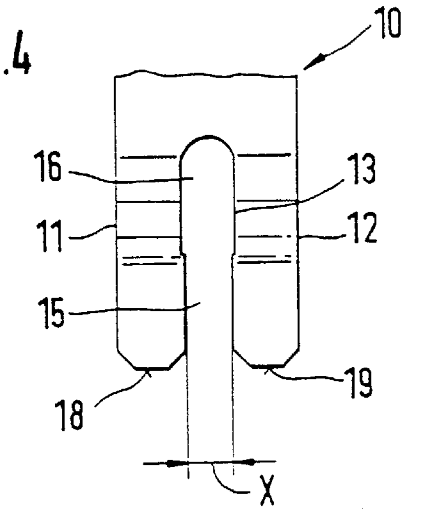
FIG. 4 is a view showing the connecting carrier of FIG. 1 from the front on an enlarged scale.
Figure 2:
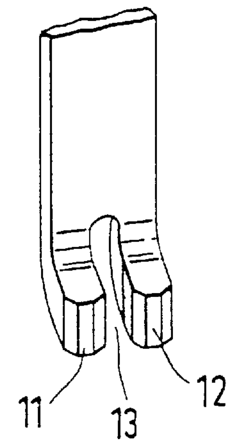
FIG. 2 is a perspective view of the connecting carrier of FIG. 1.

A connecting carrier 10 for an electrical connection in accordance with FIGS. 1–5 is composed of a flat copper band. The copper band at its end facing the connecting side has a left metal tongue 11 with a first end surface 18 and a right metal tongue 12 with a second end surface 19. A receiving gap 13 is formed between the metal tongues 11, 12. Both metal tongues 11, 12 bent at a band with an angle $\alpha$ of for example 100°. The gap 13 has a front insertion portion 15 with a gap width X and a receiving portion 16 which is insignificantly wider than the insert portion 15, as can be seen from FIG. 4.

Figure 5:
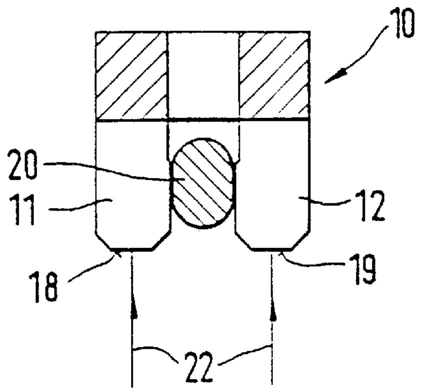
FIG. 5 is a view showing a section taken along the line V—V in FIG. 3 on an enlarged scale.
Figure 3:
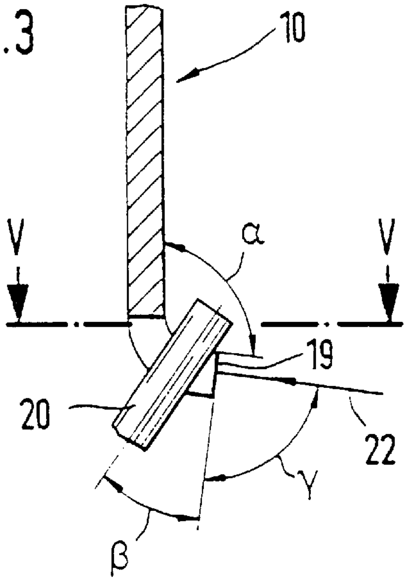
FIG. 3 is a view showing a connection with a connecting carrier of FIG. 1, as seen from the side on an enlarged scale.
Figure 6:
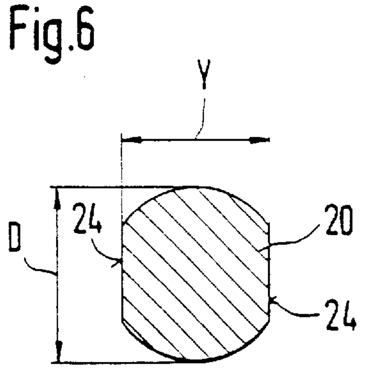
FIG. 6 is a view showing a cross-section through the connecting wire.

The connecting carrier 10 serves for receiving a wire 20. The wire is, composed for example of an iron material or an iron alloy which is welded with the connecting carrier 10 composed of copper, by means of laser radiation without an additional material. For preparation of the welding connection, the round wire 20 is located oppositely and provided with flattenings 24 which extend parallel to one another at a distance Y. The distance Y can be 0.0–0.03 mm greater than the gap width X of the insertion portion 15 as shown in FIG. 5. Thereby it is guaranteed that during positioning of the wire 20 in the connecting carrier 10 in the insertion portion 15, a slight pressure fit is provided and the wire 20 contacts the connecting carrier 10 at both metal tongues 11, 12. The wire 20 is positioned inclined at an angle $\beta$ of 40–50° in the insertion portion 15, as shown in FIG. 3.

Then the laser radiation is produced, for example with an energy of 45 Joule, a power of 2.4 kW, a pulse time 20 ms, and a focus of 0.5 by means of a bifocal shot and oriented at both end sides 18, 19 of the metal tongues 11, 12. The bifocal shot has two laser beams 22 which are oriented substantially perpendicularly (V=90°) against the both end surfaces 18, 19 of the metal tongues 11, 12.

With the bifocal laser radiation of the end surfaces 18, 19 of the connecting carrier 10, the low melting material of the connecting carrier 10 is substantially melted. At the contact surfaces between the wire 20 and the metal tongues 11, 12 of the connecting carrier 10, the material of the high melting wire 20 is melted on the outer surface. Thereby at the contact points between the wire 20 and the metal tongues 11, 12 a contact melt is produced, in which the iron part is located in the region of 10–20%. After the rigidification a mechanically rigid, electrically conductive connection between the wire 20 of the iron material and the connecting carrier 10 of copper is produced, which has no heating cracks.

It will be understood that each of the elements described above, or two or more together, may also find a useful application in other types of constructions differing from the types described above.

While the invention has been illustrated and described as embodied in method for producing an electrically conductive connection by laser radiation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A method of producing an electrically conductive connection by laser radiation, comprising the steps of providing a connecting wire of a material with a higher melting temperature;

providing a connecting carrier of a material with a lower melting temperature;

inserting the connecting wire in a joining gap between two tongues of the connecting carrier;

joining the connecting wire with the connecting carrier without an additional material;

directing the laser radiation onto an end surface of the tongues, thereby melting the connecting carrier with a lower melting temperature and melting the connecting wire with a higher melting temperature only on an outer surface.

2. A method as defined in claim 1, wherein said connecting wire is inserted in the joining gap between the two tongues of the connecting carrier by a pressure fit.

3. A method as defined in claim 1; and further comprising producing the laser radiation by a bifocal shot.

4. A method as defined in claim 3; and further comprising orienting the bifocal shot substantially perpendicularly to an end surface of tongues of the connecting carrier.

5. A method as defined in claim 1; and further comprising the step of using the laser radiation with an energy of 45–50 Joule, a power of 24 kW, a pulse time of 15–25 ms, and a focus of 0.3–0.07 mm.

* * * * *